Aug. 23, 1966  P. M. CONNAUGHT  3,267,725

VIBRATION RESPONSIVE PNEUMATIC SWITCH AND SYSTEM

Filed May 28, 1965

INVENTOR
Phillip M. Connaught

BY *Birch and Birch*

ATTORNEYS

United States Patent Office

3,267,725
Patented August 23, 1966

3,267,725
VIBRATION RESPONSIVE PNEUMATIC SWITCH AND SYSTEM
Phillip M. Connaught, King of Prussia, Pa., assignor to Robertshaw Controls Company, Richmond, Va., a corporation of Delaware
Filed May 28, 1965, Ser. No. 459,951
11 Claims. (Cl. 73—71)

This invention relates to means for generating a control signal in response to vibrations of a predetermined magnitude and more particularly, to a pneumatically powered vibration switch and system for producing a pressure output signal in response to vibrations of a predetermined magnitude and actuating an output device in response to said output signal.

This application is a continuation-in-part of my co-pending application Serial No. 159,648 filed December 15, 1961, now abandoned.

It is an object of this invention to provide a pneumatically powered vibration responsive control means for producing a pressure output signal in response to vibrations of a predetermined magnitude.

Another object of this invention is to provide a pneumatically powered vibration responsive control means for producing a pressure output signal in response to vibrations of a predetermined magnitude, wherein the means for producing the said output signal is a pneumatic thyratron.

Still another object of this invention is to provide a pneumatically powered vibration responsive control means for producing a pressure output signal in response to vibrations of a predetermined magnitude, wherein the means for producing the said output signal is a pneumatic thyratron and the means responsive to the vibrations for triggering said thyratron is a biased inertia device.

These and other objects of this invention will become apparent with reference to the following specification and drawing which relate to preferred embodiments of this invention.

Figure 1:
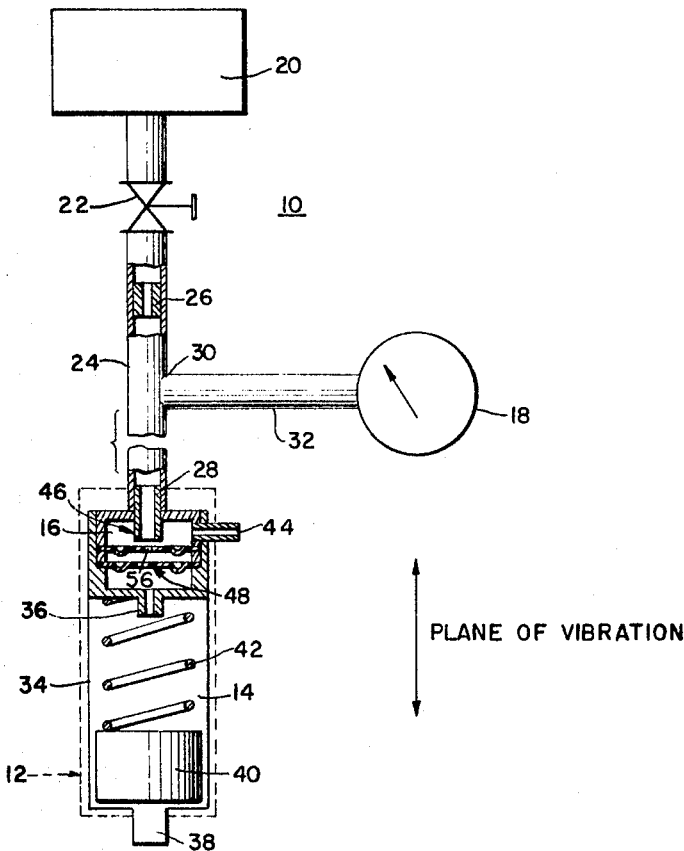
Figure 2:
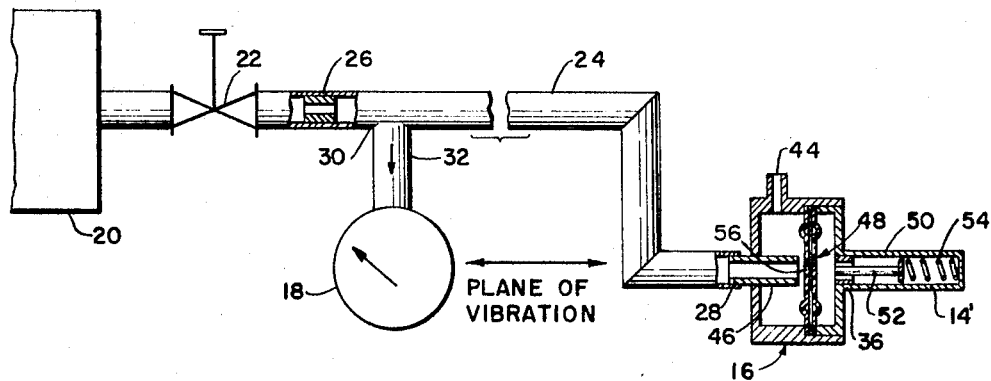

In the drawing:
FIGURE 1 is a schematic diagram of one embodiment of the invention; and
FIGURE 2 is a schematic diagram of another embodiment of the invention.

Referring in detail to the drawing and more particularly to FIGURE 1, one embodiment of the present invention will now be described.

The pneumatic vibration switch 10 is shown as comprising a housing 12, enclosing a vibration sensing means 14 and a pneumatic thyratron 16 connected therewith, an indicator or alarm means 18, actuated by the said pneumatic thyratron 16, and a supply pressure source 20 for providing the operating power, the pressure of said source being higher than ambient pressure.

The supply pressure source 20 is connected through a pressure adjusting or regulating valve 22 with the plate conduit 24 of the pneumatic thyratron 16. The source end of the plate conduit 24 contains a plate restriction 26 while the opposite end of the plate conduit 24 is plugged into the plate orifice 28 of the pneumatic thyratron 16. The plate output comprises a T-connection 30 in the plate conduit 24 between the plate restriction 26 and the plate orifice 28. The indicator, alarm, or control means 18 is connected, via a pressure lead 32 from the T-connection 30, to the plate output of the said thyratron 16.

The pneumatic thyratron and the terminology used with respect thereto are fully described in U.S. Patent No. 3,150,674 entitled, "Pneumatic Thyratron."

The vibration detecting means 14 in the housing 12 comprises a hollow cylinder 34 having one end thereof in communication with the grid orifice 36 of the pneumatic thyratron 16 with the other end vented to atmosphere as shown at 38, a piston 40 reciprocably mounted in the cylinder 34, and a compression spring means 42 acting against the said piston 40 to bias same towards that end of the cylinder 34 which is vented to atmosphere.

The remaining thyratron connection, namely the cathode orifice 44, is vented to atmosphere.

In the embodiment of FIGURE 2, the connections from the pressure source to the thyratron plate orifice 28 are identical to that of FIGURE 1 and are labelled with the same numerals. In this embodiment as in the embodiment of FIGURE 1, the thyratron 16 is cut away to show the plate nozzle 46 and the grid diaphragms 48 which control the flow of air from the plate nozzle 46 to the atmosphere via the cathode orifice 44. As stated above, this structure is fully described in U.S. Patent 3,150,674.

The vibration sensing means 14' in this embodiment comprises a hollow cylinder 50 closed at one end and plugged in at the other end to the grid input orifice 36 of the thyratron 16. An elongated slug 52 of predetermined mass but much smaller in diameter than the hollow cylinder 50 is mounted in the said cylinder 50 and extends therefrom through the grid orifice 36 of the thyratron 16 to a point adjacent the grid diaphragm 48. The slug 52 is maintained in position in the grid orifice 36 by means of a tension spring 54 connected between the slug 52 and the closed end of the hollow cylinder 50.

In this embodiment, the slug 52 is adapted to actuate the pneumatic thyratron by physically contacting the grid diaphragms 48. In contrast, the piston 40 in the embodiment of FIGURE 1 causes pressure pulses to be transmitted to the grid orifice 36 of the thyratron 16 to provide a purely pneumatic operation thereof. The foregoing embodiments of FIGURES 1 and 2, correspond, respectively to the embodiments of FIGURES 3 and 4 of U.S. Patent 3,150,674, previously cited herein and accordingly, each of the pneumatic thyratrons 16 include a central control orifice 56 in those grid diaphragms 48 adjacent to the plate nozzles 46 and aligned with the bores of the said nozzles.

OPERATION

Referring now to FIGURE 1, the housing 12 is rigidly mounted on a device (not shown), the vibration of which is to be monitored. The hollow cylinder 34 of the vibration sensing means 14 in the housing 12 is oriented such that the piston 40 therein will be able to reciprocate in the plane of the vibration to be monitored as indicated by the captioned arrow in FIGURE 1.

The piston 40 reacts to the vibration to be monitored as an inertia mass acting against the spring 42 and tends to reciprocate in the cylinder 34 with a displacement proportional to the amplitude of the said vibration. This imparts pressure pulses to the grid orifice 36 of the pneumatic thyratron 16 which, at a predetermined amplitude of vibration, are sufficient to fire the pneumatic thyratron 16 and create an output pressure signal via the T-connection 30 in the plate conduit 24 and the output pressure lead 32 to actuate the indicator, alarm, or control means 18. Thus, the sensing means 14 comprises a pressure pulse generator. When the thyratron 16 fires the output signal pressure rises from a pressure substantially equal to atmospheric to a pressure substantially equal to the supply pressure.

Referring now to FIGURE 2, the thyratron 16 and the vibration sensing means 14' are rigidly mounted with respect to a device (not shown) the vibration of which is to be monitored. As in the embodiment of FIGURE 1, the vibration sensing means 14' is mounted such that the inertia mass therein, in this case the elongated slug 52, will reciprocate in the plane of the vibration to be monitored.

The slug 52 reacts to the vibration to be monitored as an inertia mass acting against the spring 54 and tends to reciprocate in the cylinder 50 and in and out of the grid orifice 36 of the thyratron 16 with a displacement proportional to the amplitude of the said vibration. When a predetermined amplitude of vibration occurs, the slug 52 will be displaced sufficiently to strike the grid diaphragms 48 of the pneumatic thyratron with a force sufficient to cause the thyratron 16 to fire and produce a pressure output signal in the T-connection 30. This causes actuation of the indicator, alarm, or control means 18 via the pressure lead 32.

In both of the foregoing embodiments, the firing point of the thyratron is a function of the sensitivity of the system which, in turn, is a function of the spacing between the grid diaphragms 48 and plate nozzle 46, the pressure of the source 20, the mass of the piston 40 or slug 52, the spring constants of the springs 42 and 54, respectively, the vibration level and amplitude, and the size of the plate restriction 26. Varying a plate restriction 26 for a given installation varies the firing point of the pneumatic vibration switch when all of the other variables are fixed. Thus, plate restriction units pre-calibrated at the factory may readily be inserted to vary the operating point of the pneumatic vibration switch without the necessity for re-calibration at the point of use.

In the embodiment of FIGURE 2, an additional variable, namely the static distance of the slug 52 from the grid diaphragms 48, is also determinate of the firing point of the pneumatic vibration switch.

It should be noted that the plug in pressure connections may be used between the various components as hereinbefore described to permit the ready replacement of parts in the field in the event of component failure.

In both of the foregoing embodiments, because of the characteristics of the pneumatic thyratron, the pneumatic pressure output signal once initiated by a given vibration level can only be interrupted by a removal of the pneumatic pressure supplied to the plate conduit 24 of the thyratron 16. The output signal is thus continuous once initiated and must be either manually interrupted or automatically interrupted after a pre-determined interval.

As can be seen from the foregoing specification and drawing this invention provides a new and novel pneumatic vibration responsive switch and system which is readily adjustable as to vibration level and includes means whereby component parts may be readily replaced.

It is to be understood that the embodiments shown and described herein are for the purpose of example only and are not intended to limit the scope of the appended claims.

What is claimed is:

1. A vibration responsive pneumatic switch comprising a pneumatic thyratron, said thyratron comprising a housing, flexible diaphragm means in said housing forming a chamber therewith, an input orifice in said housing communicating with said chamber, nozzle means exterior to said chamber immediately adjacent said diaphragm means impinging a flow of pneumatic fluid on said diaphragm means, a source of supply pressure connected with said nozzle means, a flow restriction between said pressure source and said nozzle, a pressure tube connecting said nozzle with said flow restriction, a pressure signal outlet port in said pressure tube between said flow restriction and said nozzle, and means responsive to movement of said diaphragm toward said nozzle to further move said diaphragm means into sealing engagement with said nozzle to prevent the further flow of fluid therefrom and thereby cause the pressure at said pressure signal outlet port to rise to substantially the value of said supply pressure; and vibration sensing means coupled with said input orifice including output means effecting an actuating movement of said diaphragm toward said nozzle in response to a predetermined vibration to impart an actuating force to said diaphragm, actuate said thyratron and thereby effect a pressure rise at said signal outlet port thereof upon the occurrence of said predetermined vibration.

2. The invention defined in claim 1, wherein said vibration sensing means for actuating said thyratron comprises means extending through said input orifice to a point adjacent said diaphragm for physically engaging said diaphragm in response to a predetermined vibration to thereby actuate said thyratron.

3. The invention as defined in claim 1, wherein said sensing means comprises a hollow cylinder closed at one end and connected at its other end with said input orifice, an inertia mass mounted in said cylinder and extending through said input orifice to a point adjacent said diaphragm, and spring means for biasing said inertia mass out of contact with said diaphragm below a predetermined level of vibration.

4. The invention defined in claim 1, wherein said pneumatic switch further includes second output means, actuated in response to the actuation of said thyratron, connected to said signal outlet port.

5. The invention defined in claim 1, wherein said vibration sensing means for actuating said thyratron comprises means extending through said input orifice to a point adjacent said diaphragm for physically engaging said diaphragm in response to a predetermined vibration to thereby actuate said thyratron; and wherein said pneumatic switch further includes second output means, actuated in response to the actuation of said thyratron, connected to said signal outlet port.

6. The invention defined in claim 1, wherein said sensing means comprises a hollow cylinder closed at one end and connected at its other end with said input orifice, an inertia mass mounted in said cylinder and extending through said input orifice to a point adjacent said diaphragm, and spring means for biasing said inertia mass out of contact with said diaphragm below a predetermined level of vibration; and wherein said pneumatic switch further includes second output means, actuated in response to the actuation of said thyratron, connected to said signal outlet port.

7. A vibration responsive pneumatic switch comprising a pneumatic thyratron, said thyratron comprising a housing, flexible diaphragm means in said housing forming a chamber therewith, an input orifice in said housing communicating with said chamber, nozzle means exterior to said chamber immediately adjacent said diaphragm means impinging a flow of pneumatic fluid on said diaphragm means, a source of supply pressure connected with said nozzle means, a flow restriction between said pressure source and said nozzle, a pressure tube connecting said nozzle with said flow restriction, a pressure signal outlet port in said pressure tube between said flow restriction and said nozzle, and means responsive to movement of said diaphragm toward said nozzle to further move said diaphragm means into sealing engagement with said nozzle to prevent the further flow of fluid therefrom and thereby cause the pressure at said pressure signal outlet port to rise to substantially the value of said supply pressure; and a vibration sensing means for actuating said thyratron coupled with said input orifice comprising a pneumatic pulse generator imparting pneumatic pulses through said orifice to said chamber proportional in magnitude to the amplitude of the vibration being sensed, effecting an actuating movement of said diaphragm toward said nozzle in response to said pneumatic pulses to actuate said thyratron and effect a pressure rise at said signal outlet port thereof upon the occurrence of vibrations of predetermined amplitude.

8. The invention defined in claim 7, wherein said pneumatic pulse generator comprises a hollow cylinder, a piston in said cylinder comprising an inertia mass, and a spring for biasing said piston towards one end of said cylinder, said one end of said cylinder being vented to atmosphere and the other end of said cylinder being connected with said input orifice of said thyratron.

9. The invention defined in claim 7, wherein said pneumatic switch further includes output means, actuated in response to the actuation of said thyratron, connected to said signal outlet port.

10. The invention defined in claim 7, wherein said pneumatic pulse generator comprises a hollow cylinder, a piston in said cylinder comprising an inertia mass, and a spring for biasing said piston towards one end of said cylinder, said one end of said cylinder being vented to atmosphere and the other end of said cylinder being connected with said input orifice of said thyratron; and wherein said pneumatic switch further includes output means, actuated in response to the actuation of said thyratron, connected to said signal outlet port.

11. A pneumatic vibration sensing transducing means for use with a system of the class described delivering pneumatic pulses to said system in response to monitored vibrations comprising a hollow casing, a piston in said casing comprising an inertia mass, and resilient means for biasing said piston towards one end of said casing, said one end of said casing being vented to atmosphere and the other end of said casing being connected with said system, said casing and said piston being positioned for relative movement in the plane of and in response to the said monitored vibrations and generating pneumatic pulses at said other end of said casing as a function of the said monitored vibrations.

References Cited by the Examiner
UNITED STATES PATENTS

| | | | |
|---|---|---|---|
| 2,283,180 | 5/1942 | Buchanan | 340—261 |
| 3,150,674 | 9/1964 | Connaught | 137—82 |

RICHARD C. QUEISSER, *Primary Examiner.*

L. R. FRANKLIN, *Assistant Examiner.*